(12) United States Patent
Glueck et al.

(10) Patent No.: US 12,407,003 B2
(45) Date of Patent: Sep. 2, 2025

(54) SEPARATOR PLATE AND ELECTROCHEMICAL CELL

(71) Applicant: Reinz-Dichtungs-GmbH, Neu-Ulm (DE)

(72) Inventors: Rainer Glueck, Dornstadt-Tomerdingen (DE); Tobias Kindler, Staig (DE); Horst Gehring, Orsenhausen (DE); Thomas Stoehr, Laupheim (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 421 days.

(21) Appl. No.: 17/820,842

(22) Filed: Aug. 18, 2022

(65) Prior Publication Data

US 2023/0058717 A1    Feb. 23, 2023

(30) Foreign Application Priority Data

Aug. 20, 2021  (DE) .......................... 202021104496.9

(51) Int. Cl.

| | | |
|---|---|---|
| *H01M 8/0258* | (2016.01) | |
| *C25B 9/60* | (2021.01) | |
| *C25B 9/75* | (2021.01) | |
| *C25B 9/77* | (2021.01) | |
| *H01M 8/0206* | (2016.01) | |
| *H01M 8/0228* | (2016.01) | |
| *H01M 8/0254* | (2016.01) | |
| *H01M 8/0267* | (2016.01) | |
| *H01M 8/0276* | (2016.01) | |
| *H01M 8/18* | (2006.01) | |
| *H01M 8/2483* | (2016.01) | |

(52) U.S. Cl.
CPC ............. *H01M 8/0258* (2013.01); *C25B 9/60* (2021.01); *C25B 9/75* (2021.01); *C25B 9/77* (2021.01); *H01M 8/0206* (2013.01); *H01M 8/0228* (2013.01); *H01M 8/0254* (2013.01); *H01M 8/0267* (2013.01); *H01M 8/0276* (2013.01); *H01M 8/188* (2013.01); *H01M 8/2483* (2016.02)

(58) Field of Classification Search
None
See application file for complete search history.

(56) References Cited

U.S. PATENT DOCUMENTS

2017/0229714 A1*  8/2017  Beutel ................ H01M 8/0247
2018/0226663 A1*  8/2018  Ishida ................ H01M 8/0258

FOREIGN PATENT DOCUMENTS

DE        202019101145 U1    5/2020
JP          2006190626 A  *  7/2006

OTHER PUBLICATIONS

Machine english translation of JP-2006190626-A originally published to Kasazaki Jul. 20, 2006 (Year: 2006).*

* cited by examiner

*Primary Examiner* — Ula C Ruddock
*Assistant Examiner* — Mary Grace Byram
(74) *Attorney, Agent, or Firm* — McCoy Russell LLP (57) ABSTRACT

A separator plate for an electrochemical system, comprising a first and a second metal layer arranged with flat sides adjacent to each other. The first and the second metal layer each having at least one through-opening for supplying and/or discharging a fluid. Circumferential edges of the through-openings are formed at least in part by a half-bead. An open edge of the half-bead is angled so as to form a collar.

18 Claims, 7 Drawing Sheets

SEPARATOR PLATE AND ELECTROCHEMICAL CELL

CROSS-REFERENCE TO RELATED APPLICATION

The present application claims priority to German Utility Model Application No. 20 2021 104 496.9, entitled "SEPARATOR PLATE AND ELECTROCHEMICAL CELL", and filed Aug. 20, 2021. The entire contents of the above-listed application is hereby incorporated by reference for all purposes.

TECHNICAL FIELD

The present disclosure relates to a separator plate comprising a first and a second metal layer, such as a separator plate for an electrochemical cell. The present disclosure also relates to an electrochemical system. Such electrochemical systems are, for example, redox flow batteries, electrochemical compressors, fuel cell systems or electrolyzers.

BACKGROUND AND SUMMARY

In fuel cell systems, for example, a plurality of such separator plates are stacked perpendicular to the layer plane of the separator plate. The individual separator plates are separated from one another by means of intermediate layers, for example membranes or membrane electrode assemblies (MEAs).

A membrane electrode assembly (MEA) usually comprises an electrochemically active region, in which proton transfer takes place between the two sides of the MEA and in which electrodes and catalytic coatings are present on the membrane surfaces; outside of the electrochemically active region, the MEAs are usually encircled by a reinforcement edge. In some embodiments, at least in the electrochemically active region, a gas diffusion layer is usually also present on every surface, which gas diffusion layer makes it easier for oxygen and hydrogen to reach the coated membrane.

For the sake of simplification, in relation to the separator plates, the terms electrochemically active region and electrochemically inactive region will be used below even when referring to the regions situated opposite these regions of the MEA.

In order to delimit fluid-guiding chambers from one another and from the outside, these separator plates have a plurality of beads, such as sealing beads, which seal off in a fluid-tight manner the fluid-guiding spaces between adjacent layers of a separator plate and between separator plates and adjacent MEAs. Sealing beads may have passages along their course, which passages in cross-section extend through the sealing bead from one side of the sealing bead to the opposite side of the sealing bead and serve to convey media, such as fluids, through or transversely to the sealing bead. The passages may extend, for example, in the form of at least one tunnel, which opens into a bead flank or like the latter is raised out of the layer plane, or in the form of at least one opening in the bead flank.

Furthermore, the circumferential edges of through-openings in the metal layers and/or also the outer circumferential edge of the metal layers are often cranked so as to form a half-bead. A stable edge is created in the often very thin metal layers.

When the stack of conventional separator plates is compressed, the metal layers of the separator plate bend at their edges, such as at the circumferential edges of the through-openings and at the outer circumferential edges. There is therefore a risk that the sharp, usually punched, outer rims of the through-edges or of the outer edges of the layers will press or dig into the intermediate layers that separate the separator plates, for instance the reinforcing edges of the MEA, and in some cases perforate these. The electrical insulation between the adjacent separator plates is then ruptured as a result, and thus the functioning of the electrochemical cell or of the electrochemical system is disrupted.

The object of the present disclosure is therefore to provide a separator plate in which damage to the adjacent layers is avoided even under compression.

This object is achieved by separator plates and systems described herein.

The separator plate according to the present disclosure for an electrochemical system comprises a first and a second metal layer (separator sub-plates) which are arranged with a respective one of their flat sides adjacent to each other. This first and this second metal layer each have at least one through-opening for supplying and/or discharging a fluid, said through-openings being arranged in pairs at least substantially coaxially with respect to their axial direction of passage and form a passage opening for the fluid to pass through the separator plate. The circumferential edges of the through-openings of a respective pair of through-openings form at least in part the circumferential edge of the respective through-opening and have at least in part or all the way round a half-bead that projects out of the layer plane of the respective metal layer in a direction away from the adjacent metal layer.

According to the present disclosure, the open edge of the half-bead of each of the metal layers is angled in the direction of the layer plane of the respective metal layer so as to form a collar. However, the collar need not be formed along the entire edge; it is also sufficient to form it along part of the edge. For the through-openings and/or for the outer circumferential edges, therefore, the collar of the first and the collar of the second metal layer may be arranged along at least part of the respective edge in an adjacent and overlapping manner.

In an alternative embodiment, the separator plate according to the present disclosure for an electrochemical system comprises a first and a second metal layer which are likewise arranged with a respective one of their flat sides adjacent to each other. In this case, the outer circumferential edge of the first metal layer and the outer circumferential edge of the second metal layer each have a half-bead which at least in part forms the respective circumferential edge and projects out of the layer plane of the respective metal layer in a direction away from the adjacent metal layer.

According to the present disclosure, the open edge of the half-bead of each of the metal layers is angled in the direction of the layer plane of the respective metal layer so as to form a collar.

For one, some or all of the through-openings and/or for the outer circumferential edges, for instance the collar of the first and/or the second metal layer along the circumferential edge of the through-opening and/or the outer circumferential edge may form at least in part the boundary of the fluid-guiding through-opening and/or of the outer circumferential edge.

The inventive design of the collar prevents the situation where, when the layers are compressed in a stack, despite the bending of the half-bead, free edges for example press against adjacent softer components, such as MEAs for example, for instance the reinforcing edges thereof, and damage them.

The inventive design of the edge of the metal can be applied to one, some or all of the through-openings or also to edges of the metal layers along the outer edge of the metal layers.

A sealing bead which extends around the respective through-opening may also be arranged on the side of the half-bead remote from the respective through-opening.

In contrast to these sealing beads, the aforementioned half-beads mainly have the function of setting the edge to a defined height and stabilizing the edge. An additional sealing function of the half-beads is not necessary, but is possible.

For one, some or all of the through-openings, the sealing beads may have along their course, at least in a first portion, at least one passage which in cross-section extends through the sealing bead from one side of the sealing bead to the opposite side of the sealing bead, wherein the collar is formed only in portions adjacent to the passage(s) and/or adjacent to the first portion. Adjacent is to be understood here to mean that, for instance, no collars are arranged in the regions in which the passages are present, but collars are arranged in the other regions adjacent to this first portion.

If, for example, one through-opening has passages over 55% of its circumferential edge, collars may be arranged in both layers over the remaining 45% or at least 40% of the circumferential edge.

The separator plate may enclose, between the first and the second metal layer, a cooling region for guiding a cooling medium along a flat side of the metal layers. In addition, channel structures for forming a flow field for a fluid may be arranged on the first and second metal layer, in each case on the flat side thereof remote from the adjacent metal layer.

The length, width and direction of the collars can be varied within wide limits, as long as the function of the two collars is fulfilled, namely that of preventing damage to a separating layer with respect to an adjacent separator plate. To this end, for example, the collar of the first and/or the second metal layer may project at least in part beyond the layer plane of the respective metal layer, or may extend at an angle. For example, for one, some or all of the through-openings and/or for the outer circumferential edges, the collar of the first and/or the second metal layer may extend substantially or entirely, such as over more than 50% of its length, for example in the case of one through-opening over more than 90% of its length outside of the first portion, at an angle $\beta$ to the layer plane of the respective metal layer, where $70° \leq \beta \leq 130°$, or $80° \leq \beta \leq 120°$.

The same applies to the half-beads and their flanks. For instance, for one, some or all of the through-openings and/or for the outer circumferential edges, the flanks of the half-bead of the first and/or the second metal layer may extend substantially or entirely, such as over more than 50% of their length, for example in the case of one through-opening over more than 90% of their length outside of the first portion, at an angle $\alpha$ to the layer plane of the respective metal layer, where $20° \leq \alpha \leq 80°$, or $25° \leq \alpha \leq 60°$.

For one, some or all of the through-openings and/or for the outer circumferential edges, the collar of the respective metal layer may have one or more slots starting from the layer edge surrounding the through-opening or the outer circumferential edge in the first and/or second metal layer.

In the case of curved edges, this may compensate for the lack of material that occurs when the collar is bent out of the layer plane. Embodiments of slots which extend perpendicular to the layer edge might provide advantages, such as when they also extend to the layer edge. Due to the lack of material, for example in curved regions, slots that start perpendicular at the layer edge may also widen in their further extension, for example widen in a V-shaped manner. The slots may extend over the entire width of the respective collar. Furthermore, they may be arranged for instance in part equidistantly along the circumferential edge and thus can evenly reduce stresses in the collar that have built up during embossing.

For example, the ends of the collars of substantially coaxially arranged through-openings and/or of the outer circumferential edges of the first and the second metal layer overlap one another and/or are arranged offset from one another in a direction perpendicular to the layer plane of the first and/or the second layer. Even such an overlapping or an offset arrangement is sufficient to prevent damage to a separating layer between adjacent separator plates.

Furthermore, the collars of the first metal layer and the second metal layer need not be arranged relative to one another in a form-fitting manner, may need not be connected to one another in a form-fitting manner. This applies firstly to the collars of one passage opening, but may also apply jointly to all of the collars of the passage openings.

The present disclosure may also relate to electrochemical systems, such as redox flow batteries, electrochemical compressors, fuel cell systems or electrolyzers, comprising a plurality of separator plates according to the present disclosure, wherein the plurality of separator plates are stacked perpendicular to the layer plane of the first and/or to the layer plane of the second metal layer. In fuel cell systems, the MEAs are usually arranged in a manner alternating with the individual separator plates.

A few examples of separator plates according to the present disclosure will be given below. Identical or similar reference signs denote identical or similar elements, and therefore, where applicable, the description of these elements and reference signs will not be repeated. Each of the following examples implements a variety of optional features in addition to the mandatory features of the present disclosure. However, all the non-mandatory features not specified in the independent claims can also be combined, individually or in any combination, with other non-mandatory features of the same example or of one or more other examples.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1-10C are shown approximately to scale.

DETAILED DESCRIPTION

Figure 1:
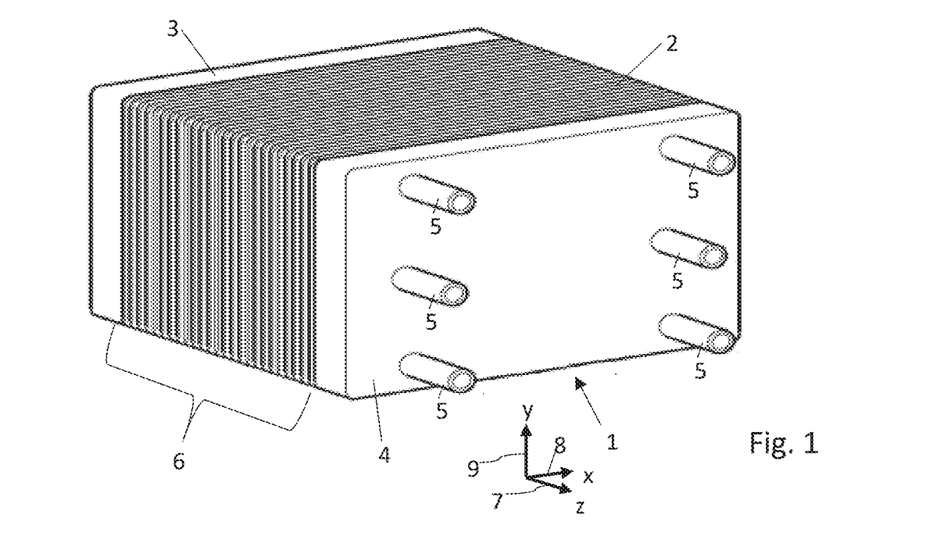
FIG. 1 shows a fuel cell according to the present disclosure.

FIG. 1 shows an electrochemical system 1 comprising a plurality of structurally identical metal separator plates 2, which are arranged in a stack 6 and are stacked along a z-direction 7. The separator plates 2 of the stack 6 are clamped between two end plates 3, 4. The z-direction 7 will also be referred to as the stacking direction. In the present example, the system 1 is a fuel cell stack. Each two adjacent separator plates 2 of the stack therefore bound an electrochemical cell, which serves for example to convert chemical energy into electrical energy. To form the electrochemical cells of the system 1, a membrane electrode assembly (MEA) 10 is arranged in each case between adjacent separator plates 2 of the stack (see for example FIG. 2).

Each MEA 10 contains at least one membrane, for example an electrolyte membrane. Furthermore, a gas diffusion layer (GDL) may be arranged on one or both surfaces of the MEA. Adjacent separator sub-plates, which are not separated from one another by an MEA, form a separator plate according to the present disclosure with the two separator sub-plates as a first and second metal layer, which separator plate separates two electrochemically active fields from one another.

In alternative embodiments, the system 1 may also be designed as an electrolyzer, as an electrochemical compressor or as a redox flow battery. Separator plates may likewise be used in these electrochemical systems. The structure of these separator plates may then correspond to the structure of the separator plates 2 explained in detail here, although the media guided on and/or through the separator plates in the case of an electrolyzer, an electrochemical compressor or a redox flow battery may differ in each case from the media used for a fuel cell system.

The z-axis 7, together with an x-axis 8 and a y-axis 9, spans a right-handed Cartesian coordinate system. The separator plates 2 each define a plate plane, wherein the plate planes of the separator plates 2 or of the layers 2a, 2b thereof are each oriented parallel to the x-y plane and thus perpendicular to the stacking direction or to the z-axis 7. The end plate 4 usually has a plurality of media ports 5, via which media can be fed to the system 1 and via which media can be discharged from the system 1. Said media that can be fed to the system 1 and discharged from the system 1 may comprise for example fuels such as molecular hydrogen or methanol, reaction gases such as air or oxygen, reaction products such as water vapor or depleted fuels, or coolants such as water and/or glycol.

Figure 2:
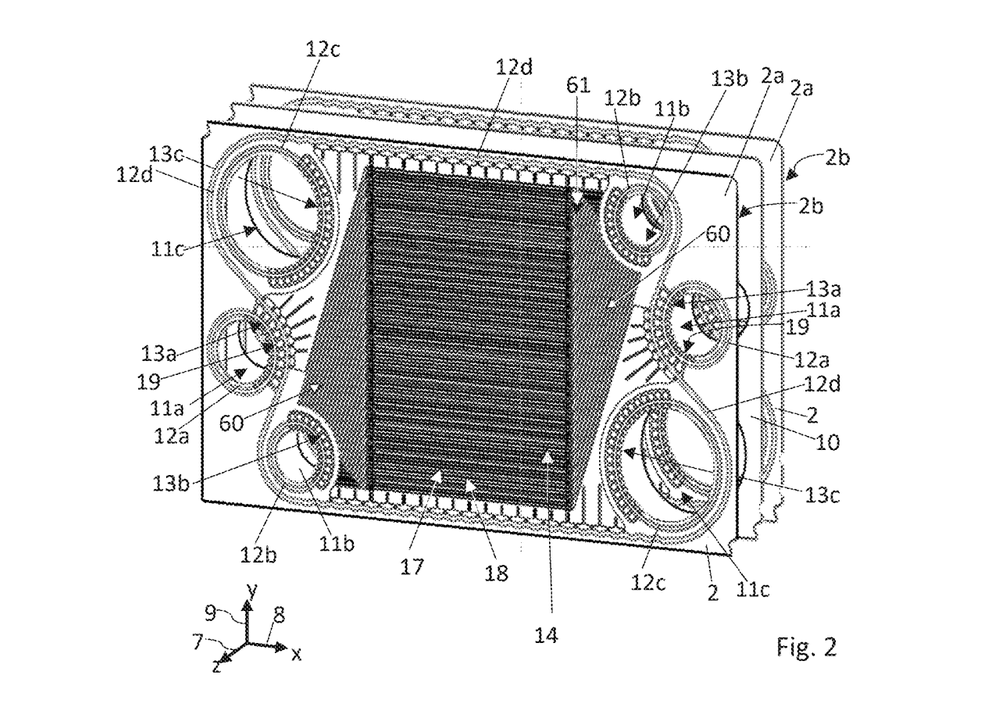
FIG. 2 shows an arrangement comprising a MEA and separator plates of the fuel cell of FIG. 1.

FIG. 2 shows, in a perspective view, two adjacent separator plates 2 of an electrochemical system of the same type as the system 1 from FIG. 1, as well as a membrane electrode assembly (MEA) 10 which is arranged between these adjacent separator plates 2, the MEA 10 in FIG. 2 being largely obscured by the separator plate 2 facing towards the viewer.

The bipolar plate 2 is formed of two separator sub-plates or layers 2a, 2b which are joined together in a materially bonded manner, of which in each case only the first separator sub-plate 2a facing towards the viewer is visible in FIG. 2, said first separator sub-plate obscuring the second separator sub-plate 2b. The separator sub-plates 2a, 2b each comprise at least one metal layer, for example formed of a stainless-steel sheet. Two adjacent separator sub-plates 2a, 2b together form a separator plate and may be connected to one another, for example by welding, e.g. by laser welds.

The separator sub-plates 2a, 2b typically have through-openings which are aligned with one another and form through-openings 11a-c of the separator plate 2. When a plurality of separator plates of the same type as the separator plate 2 are stacked, the through-openings 11a-c form lines which extend through the stack 6 in the stacking direction 7 (see FIG. 1). Typically, each of the lines formed by the through-openings 11a-c is fluidically connected to one of the ports 5 in the end plate 4 of the system 1. For example, coolant can be introduced into the stack 6 or discharged from the stack via the lines formed by the through-openings 11a. In contrast, the lines formed by the through-openings 11b, 11c may be designed to supply fuel and reaction gas to the electrochemical cells of the fuel cell stack 6 of the system 1 and to discharge the reaction products from the stack. The media-guiding through-openings 11a-c are formed substantially parallel to the plate plane.

In order to seal off the through-openings 11a-c with respect to the interior of the stack 6 and with respect to the surrounding environment, the first separator sub-plates 2a each have sealing arrangements in the form of sealing beads 12a-c, which are respectively arranged around the through-openings 11a-c and in each case completely surround the through-openings 11a-c. On the rear side of the separator plates 2, facing away from the viewer of FIG. 2, the second separator sub-plates 2b have corresponding sealing beads for sealing off the through-openings 11a-c (not shown).

In an electrochemically active region 18, the first separator sub-plates 2a have, on the front side thereof facing towards the viewer of FIG. 2, a flow field 17 with first structures 14 for guiding a reaction medium along the outer side (or also front side) of the separator sub-plate 2a. In FIG. 2, these first structures 14 are defined by a plurality of webs and by channels extending between the webs and delimited by the webs. On the front side of the separator plates 2, facing towards the viewer of FIG. 2, the first separator sub-plates 2a additionally each have a distribution or collection region 60. The distribution or collection region 60 comprises structures 61 which are designed to distribute over the active region 18 a medium that is introduced into the distribution or collection region 60 from a first of the two through-openings 11b, and/or to collect or to pool a medium flowing towards the second of the through-openings 11b from the active region 18. In FIG. 2, the distributing structures 61 of the distribution or collection region 60 are likewise defined by webs and by channels extending between the webs and delimited by the webs.

The sealing beads 12a-12c have passages 13a-13c, of which the passages 13a are formed both on the underside of the upper separator sub-plate 2a and on the upper side of the lower separator sub-plate 2b, while the passages 13b are formed in the upper separator sub-plate 2a and the passages 13c are formed in the lower separator sub-plate 2b. By way of example, the passages 13a enable coolant to pass between the through-opening 12a and the distribution or collection region 60, so that the coolant enters the distribution or collection region 60 between the separator plates 2a, 2b and is guided out therefrom.

Furthermore, the passages 13b enable hydrogen to pass between the through-opening 12b and the distribution or collection region on the upper side of the upper separator sub-plate 2a; these passages 13b are characterized by perforations facing towards the distribution or collection region and extending at an angle to the plate plane. By way of example, hydrogen thus flows through the passages 13b from the through-opening 12b to the distribution or collection region on the upper side of the upper separator sub-plate 2a, or in the opposite direction.

The passages 13c enable air, for example, to pass between the through-opening 12c and the distribution or collection region, so that air enters the distribution or collection region on the underside of the lower separator sub-plate 2b and is guided out therefrom. The associated perforations are not visible here.

The first separator sub-plates 2a each also have a further sealing arrangement in the form of a perimeter bead 12d, which extends around the flow field 17 of the active region 18 and also around the distribution or collection region 60 and the through-openings 11b, 11c and seals these off with respect to the through-opening 11a, that is to say with respect to the coolant circuit, and with respect to the environment surrounding the system 1. The second separator sub-plates 2b each comprise corresponding perimeter beads 12d. The structures of the active region 18, the distributing or collecting structures of the distribution or collection region 60 and the sealing beads 12a-d are each formed in one piece with the separator sub-plates 2a and are integrally formed in the separator sub-plates 2a, for example in an embossing, hydroforming or deep-drawing process. The same applies to the corresponding distributing structures and sealing beads of the second separator sub-plates 2b. Each sealing bead 12a-12d may have in cross-section at least one bead top and two bead flanks, but a substantially angular arrangement between these elements is not necessary; a curved transition may also be provided.

While the sealing beads 12a-12c take a substantially round course, the perimeter bead 12d has various portions of different shape. For instance, the course of the perimeter bead 12d may comprise at least two wavy portions.

The two through-openings 11b or the lines through the plate stack of the system 1 that are formed by the through-openings 11b are each fluidically connected to one another via passages 13b in the sealing beads 12b, via the distributing structures of the distribution or collection region 60 and via the flow field 17 in the active region 18 of the first separator sub-plates 2a facing towards the viewer of FIG. 2. Analogously, the two through-openings 11c or the lines through the plate stack of the system 1 that are formed by the through-openings 11c are each fluidically connected to one another via corresponding bead passages, via corresponding distributing structures and via a corresponding flow field on an outer side of the second separator sub-plates 2b facing away from the viewer of FIG. 2. To this end, first structures 14, such as channel structures, for guiding the relevant media are provided in each of the active regions 18.

In contrast, the through-openings 11a or the lines through the plate stack of the system 1 that are formed by the through-openings 11a are each fluidically connected to one another via a cavity 19 which is surrounded or enclosed by the separator sub-plates 2a, 2b. This cavity 19 serves in each case to guide a coolant through the separator plate 2, such as for cooling the electrochemically active region 18 of the separator plate 2. The coolant thus serves primarily to cool the electrochemically active region 18 of the separator plate 2. The coolant flows through the cavity 19 from an inlet opening 11a towards an outlet opening 11a. Mixtures of water and antifreeze are often used as coolants. However, other coolants are also conceivable. For guidance of the coolant or cooling medium, second structures are present on the inner side of the separator plate 2. Said second structures are not visible in FIG. 2 since they extend, for example, on the surface of the separator sub-plate 2a facing away from the viewer; they are therefore situated opposite the above-mentioned first structures 14 on the other surface of the separator sub-plate 2a. In the active region 18, the second structures 15 guide the cooling medium along the inner side of the separator plate towards the outlet opening 11a. The second structures typically comprise channel structures for guiding the cooling fluid, which define a longitudinal flow direction of the cooling medium.

The separator plate according to the present disclosure comprises two metal layers, which correspond to directly adjacent separator sub-plates 2a and 2b of different separator plates in FIG. 1 and FIG. 2. Together, these two metal layers as a separator plate separate two electrochemically active regions from one another.

The inventive design of edge regions around through-openings or at outer edges of separator plates will be presented below. With regard to the technical explanation, it is irrelevant whether the edge region is an edge region of through-openings or an outer edge region.

The individual metal layers are therefore denoted by reference signs 20a, 20b, 20c and 20d, wherein 20a and 20b form a separator plate according to the present disclosure and 20c and 20d form a separator plate according to the present disclosure. Sealing beads are denoted by reference signs 21a, 21b, 21c and 21d, the half-beads according to the present disclosure are denoted by reference signs 22a, 22b, 22c and 22d, the rims at the circumferential edge or outer edge are denoted by reference signs 23a, 23b, 23c and 23d, and the collars are denoted by reference signs 24a, 24b, 24c and 24d. In general, therefore, the metal layers are denoted by reference sign 20 in addition to reference signs 2a and 2b from FIG. 2, the sealing beads are denoted by reference sign 21 in addition to reference signs 12a-d from FIG. 2, the half-beads are denoted by reference sign 22, the rims by reference sign 23, and the collars by reference sign 24.

Figure 3A:
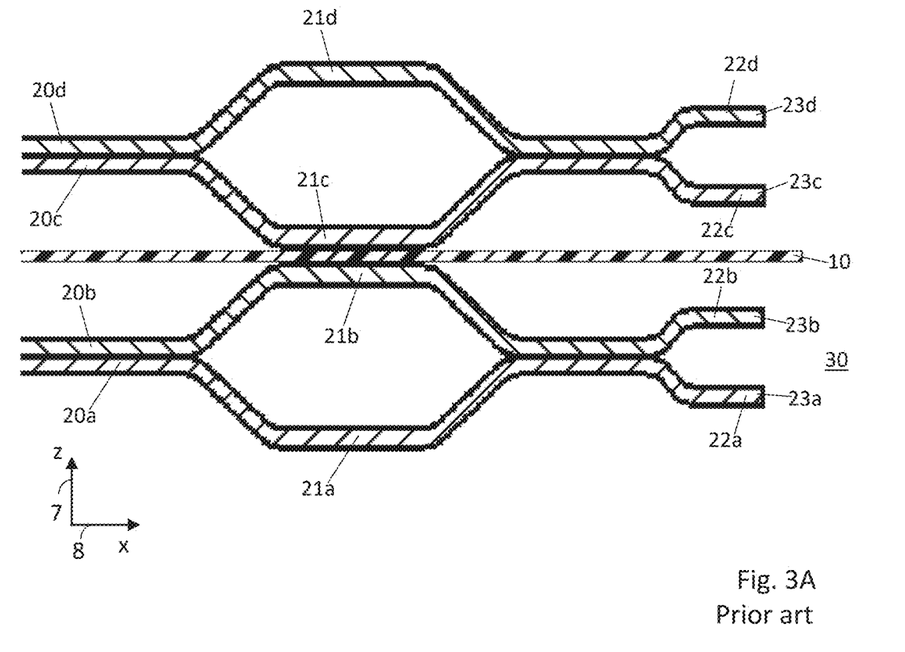
FIG. 3A shows a detail around a fluid through-opening of two conventional separator plates, in cross-section, prior to compression in a fuel cell stack.

FIG. 3 shows in sub-FIG. 3A a non-compressed stack comprises two conventional separator plates, each comprising two metal layers 21a, 21b or 21c, 21d, which separator plates are separated from one another and such as electrically insulated from one another by an electrically insulating separation membrane 10, for example an MEA. Each of the layers has an outer rim 23a, 23b, 23c or 23d with respect to an opening 30 or with respect to an exterior 30. At the edge of each of these layers, which ends in the respective rim, each of these layers has a half-bead 22a, 22b, 22c or 22d which is open towards the rim. This makes it possible to provide a stable edge despite the usually small sheet thickness.

Figure 3B:
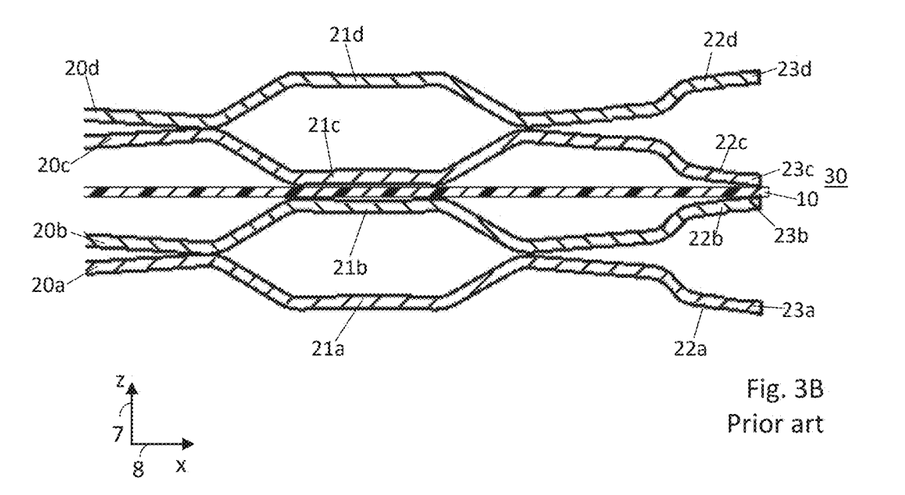
FIG. 3B shows the same detail under compression in a fuel cell stack.

FIG. 3B shows the same stack from FIG. 3A, now in the compressed state. As a result of the compression, the edges of the layers 20a, 20b, 20c and 20d bend in such a way that the sharp rims 23b and 23c press against the separating layer 10 and may perforate the latter. As soon as the layers 20b and 20c touch one another, the electrical insulation between these layers is voided and thus the electrochemical cell is unable to function.

Figure 4:
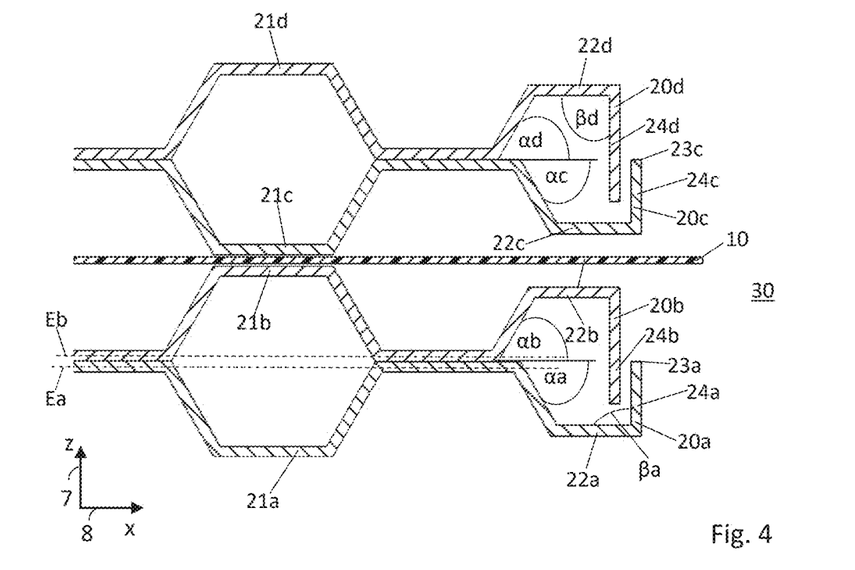
FIGS. 4 to 8 show details, in plain view or in cross-section, of separator plates according to the present disclosure.

FIG. 4 shows an inventive design of the edges of the metal layers 20a, 20b, 20c and 20d in a view as in FIG. 3A. The half-beads 22a and 22b are each angled at their edges so as to form a collar 24a, 24b with respect to the respectively adjacent layer.

The collars 24a and 24b overlap as seen in the layer plane Ea, Eb of the layers 20a and 20b or of the MEA 10. This offset between the two collars 24a and 24b in the cross-section of the layers 20a and 20b is created by arranging the half-bead 22a with its bead foot closer to an adjacent sealing bead 21a than the half-bead 22b to an adjacent sealing bead 21b extending symmetrically to the sealing bead 21a. However, the bead top of the half-beads 22a and 22b is of equal length in the radial direction around the exterior 30.

The collar 24b, which extends into the interior space of the half-bead 20a and is radially further away from the region 30 than the collar 24a, is wider than the collar 24a in the example of FIG. 4. When the two metal layers 20a and 20b are compressed against one another, the half-beads 22a and 22b may gape open as shown in FIG. 3B, but the wide collar 24b prevents the collar 24a from touching the MEA 10 and possibly damaging it.

Embodiments of collars 24a and 24b each may have a width which ensures that their free ends overlap even in the compressed state, even when the half-beads gape open, in order to ensure a sufficient distance of the collar 24a from the MEA 10 even under compression. To this end, the collars 24a and 24b are wider in total than the distance between the bead tops of the half-beads 22a and 22b, for instance at least 20% wider. Furthermore, as a result of the collars 24a, 24b, the through-openings have defined outer walls at least over large portions along their course, which lead to low turbulence and thus low pressure losses of the media guided in the through-openings.

The collars 24a, 24b, 24c and 24d are schematically shown in FIG. 4 and in other figures at a right angle βa, ... to the bead top of the half-beads 22a, 22b, 22c and 22d. However, it is also possible that the angles between the bead top and the collar are different than 90°, for example they may be 70°≤β≤130° or 80°≤β≤120°, for example angles >90°. Here, the angles are indicated as angles relative to the contact planes of the layers 20a, 20b or 20c and 20d; these extend parallel to the layer planes Ea, Eb . . . , which each extend in the neutral axes of the non-deformed sheet-metal portions.

The edges of the layers 20c and 20d are also designed in a manner corresponding to the edges of the layers 20a and 20b.

Figure 5:
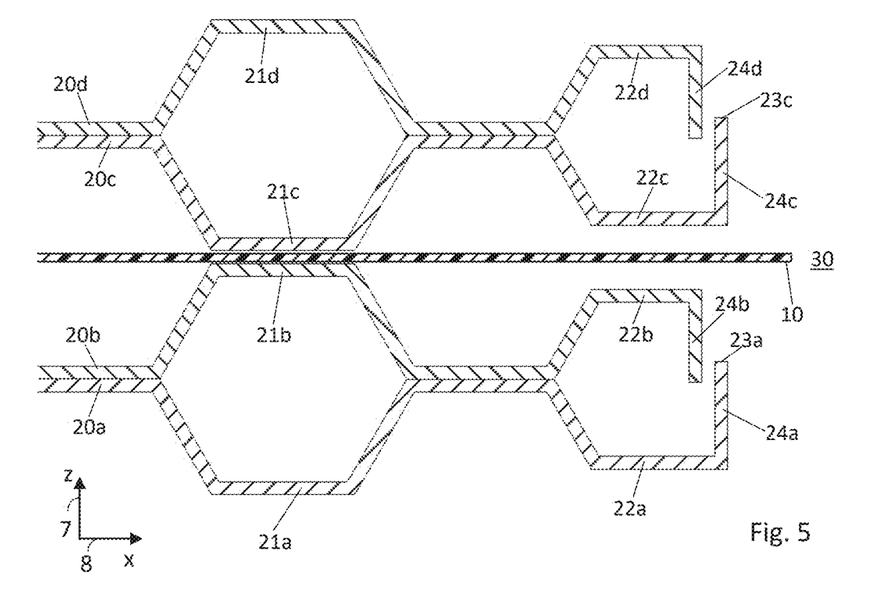

FIG. 5 shows an embodiment similar to that in FIG. 4. In this embodiment, the offset between the collars 22a and 22b and the offset between the collars 22c and 22d is created as a result of the fact that the half-beads 22a and 22c have a bead top which, compared to the half-beads 22c and 22d, is longer in the radial direction around the exterior. The bead legs of the half-beads enclose with the layer plane an angle α of 60° with respect to the respective metal layer; in other embodiments, however, significantly different angles in the range of 20°≤α≤80° are possible.

Figure 6:
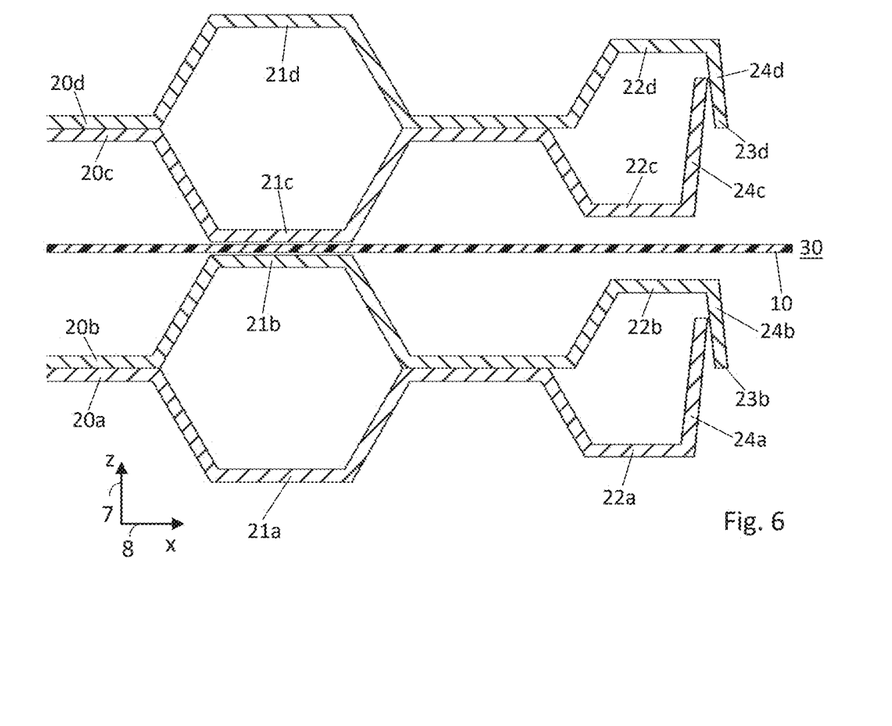

FIG. 6 shows an embodiment similar to that in FIG. 5. In a manner differing therefrom, however, the bead tops of the half-beads 22a and 22b and of the half-beads 22c and 22d are each of equal length in the radial direction. The offset between the collars 24a and 24b is swapped round compared to FIG. 5; the collar 24a extends within the space spanned by the half-bead 22b and the collar 24b. This offset is created by offsetting the bead feet of the half-beads 22a and 22b relative to one another as in FIG. 4.

Furthermore, the collars 24a and 24b do not extend at a right angle to the adjacent bead tops of the half-beads 22a and 22b in the respective same layer 20a and 20b, respectively, but instead extend at an enclosed angle between the bead top and the collar of more than 90°.

The preceding three embodiments each show half-beads and collars with sharp rims; this is a simplification for the sake of the drawing. In actual fact, all the rims are rounded or formed with a radius that is set during the shaping. Furthermore, all the exemplary embodiments are shown with a straight or flat bead roof; in actual fact, use can also be made of bead tops that are rounded or domed in cross-section.

Figure 7:
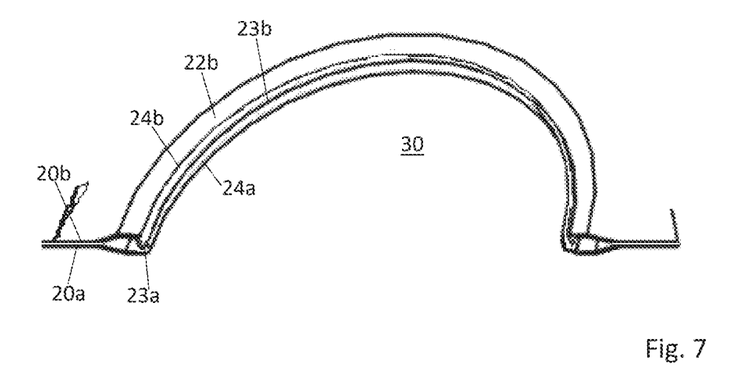

FIG. 7 shows a detail from a further embodiment of the present disclosure around a through-opening 30, in a cut-away oblique view.

For clarity, the MEA 10 below the layer 20a and above the layer 20b has not been shown. The design of the edges of the layers 20a and 20b around the opening 30 corresponds to that in FIG. 5. The collar 24b engages in the space spanned by the half-bead 22a and the collar 24a.

Figure 8:
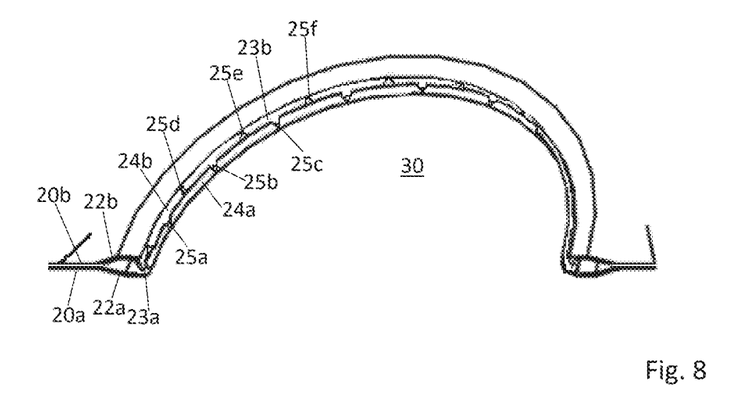

FIG. 8 shows a further embodiment of the present disclosure, which is similar to that in FIG. 7. In a manner differing therefrom, the collar 24a along the circumferential edge of the opening 30 has slots 25a, 25b, 25c, etc. at regular intervals. These slots compensate for the lack of material that results from bending the edge of the layer 20a to form the collar 24a. In the same way, the collar 24b along the circumferential edge of the opening 30 has slots 25d, 25e, 25f, etc. at regular intervals, which compensate for the excess material that results from bending the edge of the layer 20b to form the collar 24b.

Figure 9:
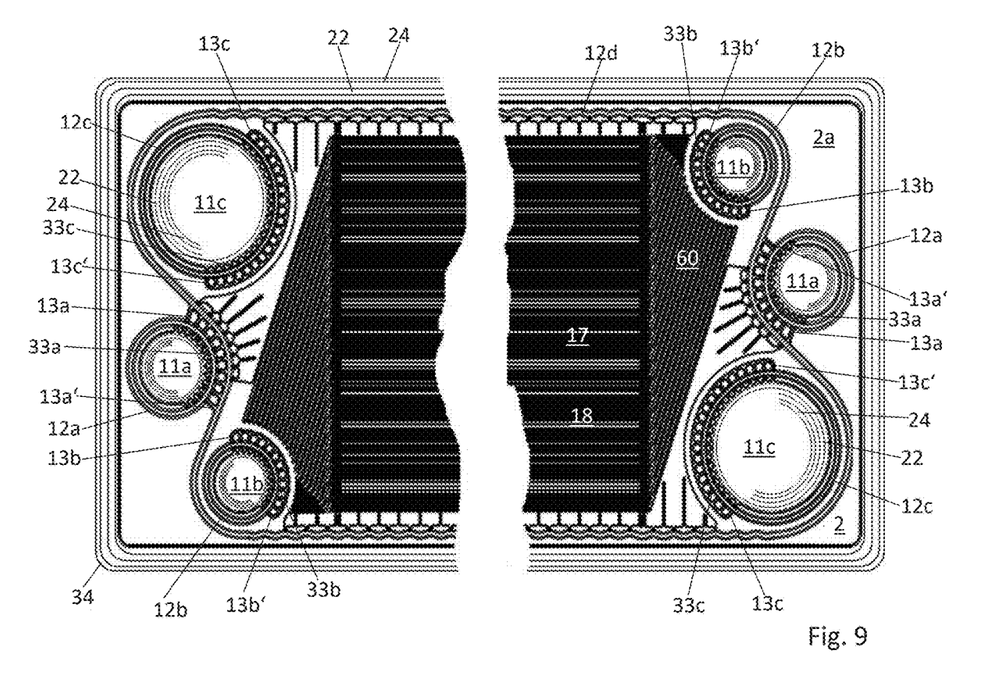
FIG. 9 shows a plan view of a separator plate according to the present disclosure.

FIG. 9 shows a plan view of a separator plate 2 similar to that of FIG. 2. However, the upper layer 2a has half-beads 22 and collars 24 extending both around its outer edge 34 and also in part around its through-openings 11a-11c. Embodiments of the half-beads 22 and the collars 24 at the outer edge 34 extend only in part parallel to the perimeter bead 12d. The through-openings 11a-11c each have first portions 33a-33c, in which the sealing beads 12a-12c have passages 13a-13c. The first portions 33a-33c each extend clockwise from the passage denoted by a reference sign without a prime, for example 13a, 13b, 13c, to the passage denoted by a reference sign with a prime, for example 13a, 13b, 13c. No collars 24 are arranged in each of these first portions. Embodiments of the collars 24 are therefore formed only adjacent to the first portions 33a-33c. For the sake of clarity, embodiments of the collars 24 and half-beads 22 have been provided with their own reference signs only in the through-openings 11c. FIG. 9 shows a separator plate 2 in which half-beads 22 and collars 24 are formed both at the outer edge 34 and also at the through-openings 11a-11c. However, embodiments of the combination of half-bead 22 and collar 24 may also be formed only at the outer edge 34 or only at least one, some or all of the through-openings 11a-11c.

Figure 10A:
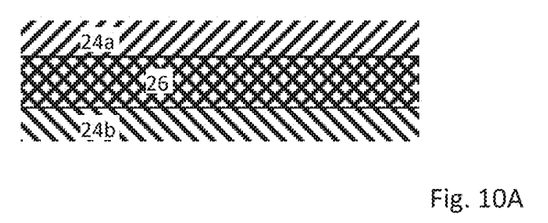
FIGS. 10A to 10C show different implementation details of the plan views of the collars of separator plates according to the present disclosure.
Figure 10B:
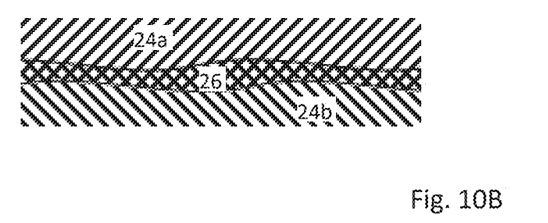
Figure 10C:
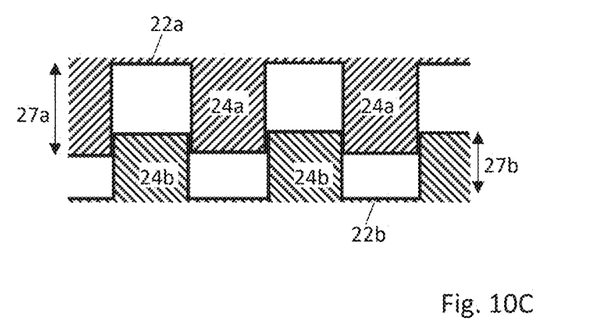

FIGS. 10A to 10C each show implementation details of the plan views of the collars of the separator plate according to the present disclosure. Here, the viewing direction is directed from the middle of a through-opening towards the circumferential edge thereof, or looking from outside substantially perpendicularly towards an outer circumferential edge of a separator plate.

FIG. 10A shows an exemplary embodiment in which the collars have a constant width all the way round, the collar 24a of the upper layer having with the collar of the lower layer 24b an overlap region 26 that is of constant width all the way round. FIG. 10B, on the other hand, shows an exemplary embodiment in which the collars have a width that varies around the circumference, so that the collar 24a of the upper layer forms with the collar of the lower layer 24b a circumferential overlap region 26, but the width of which varies in the circumferential direction.

FIG. 10C shows an exemplary embodiment in which the ends of the collars 24a, 24b of the first and the second metal layer are arranged offset from one another in a direction perpendicular to the layer plane of the first or second layer. Although no direct overlap region is formed here, any impairment of the MEAs adjacent to the separator plates in the installed state is avoided since the bead tops of the half-beads 22a, 22b can each form a stop and since the collars 24a, 24b have a considerable width 27a, 27b.

Embodiments of the collars (for example 24a, 24b, 24c and 24d) only have to be arranged along part of the circumferential edge of the through-opening or along part of the outer edge of the respective metal layer. In addition, it is possible that adjacent, mutually facing collars of adjacent layers only overlap in part.

FIGS. 1-10C are shown approximately to scale. FIGS. 1-10C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" or "substantially" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A separator plate for an electrochemical system, comprising:
   a first and a second metal layer which are arranged with a respective one of their flat sides adjacent to each other,
   wherein the first and the second metal layer each have at least one through-opening for supplying and/or discharging a fluid, said through-openings being arranged in pairs at least substantially coaxially with respect to their axial direction of passage and form a passage opening for the fluid to pass through the separator plate,
   wherein circumferential edges of the through-openings of a respective pair of through-openings have a half-bead which at least in part forms the circumferential edge of the respective through-opening and projects out of a layer plane of the respective metal layer in a direction away from the adjacent metal layer,
   wherein an open edge of the half-bead of each of the metal layers is angled in the direction of the layer plane of the respective metal layer so as to form a collar,
   wherein ends of the collar overlap in a direction perpendicular to the layer plane of the first metal layer and/or the second metal layer,
   wherein the collar of the first metal layer is radially further away from the through-opening than the collar of the second metal layer, and
   wherein for at least one of the through-openings, the collar of the first metal layer projects at least in part beyond the layer plane of the first metal layer and at least partially into or beyond the layer plane of the second metal layer.

2. The separator plate according to claim 1, wherein for at least one of the through-openings, a sealing bead which extends around the respective through-opening is arranged on the side of the half-bead remote from the respective through-opening.

3. The separator plate according to claim 2, wherein for at least one of the through-openings, the sealing bead has along its course, at least in a first portion, at least one passage which in cross-section extends through the sealing bead from one side of the sealing bead to the opposite side of the sealing bead, and wherein the collar is formed only in portions adjacent to the passage and/or adjacent to the first portion.

4. The separator plate according to claim 1, wherein an outer circumferential edge of the first metal layer and an outer circumferential edge of the second metal layer each have a half-bead which at least in part forms the respective outer circumferential edge and projects out of the layer plane of the respective metal layer in a direction away from the adjacent metal layer, and wherein the open edge of this half-bead of each of the metal layers is angled in the direction of the layer plane of the respective metal layer so as to form a collar.

5. A separator plate for an electrochemical system, comprising:

a first and a second metal layer which are arranged with a respective one of their flat sides adjacent to each other, wherein an outer circumferential edge of the first metal layer and an outer circumferential edge of the second metal layer each have a half-bead which at least in part forms the respective circumferential edge and projects out of a layer plane of the respective metal layer in a direction away from the adjacent metal layer, wherein an open edge of the half-bead of each of the metal layers is angled in the direction of the layer plane of the respective metal layer so as to form a collar, wherein a first plane perpendicular to the layer plane and intersecting a terminal edge of the collar of the first metal layer is offset from and parallel to a second plane perpendicular to the layer plane and intersecting a terminal edge of the collar of the second metal layer, and wherein the collar of the first metal layer projects at least in part beyond the layer plane of the first metal layer and at least partially into or beyond the layer plane of the second metal layer.

6. The separator plate according to claim 1, wherein for at least one of the through-openings, the collar of the first metal layer and the collar of the second metal layer are arranged along at least part of the respective circumferential edge in an adjacent and overlapping manner.

7. The separator plate according to claim 3, wherein for at least one of the through-openings, a flank of the half-bead of the first and/or the second metal layer extends over more than 50% of its length outside of the first portion, at an angle $\alpha$ to the layer plane of the respective metal layer, where $20° \leq \alpha \leq 80°$.

8. The separator plate according to claim 3, wherein for at least one of the through-openings, the collar of the first and/or the second metal layer extends over more than 50% of its length, outside of the first portion, at an angle $\beta$ to the layer plane of the respective metal layer, where $70° \leq \beta \leq 130°$.

9. The separator plate according to claim 1, wherein for at least one of the through-openings, the collar of the first and/or the second metal layer along the circumferential edge of the through-opening forms at least in part the boundary of the through-opening.

10. The separator plate according to claim 1, wherein for at least one of the through-openings, the collar of the respective metal layer has one or more slots starting from an edge of the respective metal layer surrounding the through-opening in the first and/or second metal layer.

11. The separator plate according to claim 10, wherein for at least one of the through-openings, the one or more slots extend substantially perpendicular to the edge of the respective metal layer and have a length that is less than or equal to the wide of the respective collar.

12. The separator plate according to claim 10, wherein for at least one of the through-openings, the one or more slots are arranged along the circumferential edge of the through-openings.

13. The separator plate according to claim 1, wherein for at least one of the through-openings, at least in part or all the way round, the ends of the collars of substantially coaxially arranged through-openings of the first and the second metal layer overlap one another so as to form at least one overlap region and/or are arranged offset from one another in a direction perpendicular to the layer plane of the first and/or the second layer.

14. The separator plate according to claim 1, wherein for at least one of the through-openings, the collars of the first metal layer and the second metal layer are not arranged relative to one another in a form-fitting manner.

15. The separator plate according to claim 1, wherein for through-openings arranged substantially coaxial to one another, a flank of the half-bead of the first metal layer and a flank of the half-bead of the second metal layer are arranged at different positions perpendicular to the bead running direction, which extends along the respective circumferential edge of the through-opening.

16. An electrochemical system comprising a plurality of separator plates according to claim 1, wherein the plurality of separator plates are stacked perpendicular to the layer plane of the first and/or to the layer plane of the second metal layer.

17. The separator plate according to claim 5, wherein the collar of the first metal layer and the collar of the second metal layer are arranged along at least part of the outer circumferential edge of the first metal layer and/or the second metal layer in an adjacent and overlapping manner.

18. The separator plate according to claim 5, wherein, at least in part or all the way round, the ends of the collars of the outer circumferential edges of the first metal layer and the second metal layer overlap one another so as to form at least one overlap region and/or are arranged offset from one another in a direction perpendicular to the layer plane of the first and/or the second layer.

* * * * *